United States Patent
Shirai et al.

(10) Patent No.: US 10,362,618 B2
(45) Date of Patent: Jul. 23, 2019

(54) COMMUNICATION SYSTEM, COMMUNICATION DEVICE, AND METHOD FOR RECONNECTING COMMUNICATION SYSTEM

(71) Applicant: YAMAHA CORPORATION, Hamamatsu-shi (JP)

(72) Inventors: Masakazu Shirai, Toyohashi (JP); Yuki Suemitsu, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/718,732

(22) Filed: Sep. 28, 2017

(65) Prior Publication Data

US 2018/0020497 A1    Jan. 18, 2018

Related U.S. Application Data

(63) Continuation of application No. PCT/JP2016/074191, filed on Aug. 19, 2016.

(30) Foreign Application Priority Data

Aug. 19, 2015    (JP) .................................. 2015-162328

(51) Int. Cl.
  *H04W 76/19*    (2018.01)
  *H04W 76/30*    (2018.01)
  (Continued)

(52) U.S. Cl.
  CPC ........... *H04W 76/19* (2018.02); *H04W 40/34* (2013.01); *H04W 76/30* (2018.02); *H04W 84/12* (2013.01); *H04W 84/18* (2013.01); *H04W 88/04* (2013.01)

(58) Field of Classification Search
  CPC ..... H04W 40/34; H04W 76/19; H04W 76/30; H04W 84/12; H04W 84/18; H04W 88/04; H04W 76/028; H04W 76/06; G10K 15/02
  See application file for complete search history.

(56) References Cited

U.S. PATENT DOCUMENTS 7,505,450 B2    3/2009    Castagnoli
9,036,509 B1 *  5/2015    Addepalli ............. H04W 4/046
                                                    370/259

(Continued)

FOREIGN PATENT DOCUMENTS

JP    2001156929 A    6/2001
JP    2001359200 A    12/2001

(Continued)

OTHER PUBLICATIONS

English translation of Written Opinion issued in Intl. Appln. No. PCT/JP2016/074191 dated Nov. 8, 2016, previously cited in IDS filed Sep. 28, 2017.

(Continued)

*Primary Examiner* — Steven H Nguyen
(74) *Attorney, Agent, or Firm* — Rossi, Kimms & McDowell LLP

(57) ABSTRACT

A communication system includes a plurality of communication devices constituting a network. Each of the communication devices includes a first wireless communication circuit and a second wireless communication circuit. The second wireless communication circuit of a lower-level communication device accesses the first wireless communication circuit of a higher-level communication device, whereby the higher-level communication device and the lower-level communication device are connected so as to constitute the network. Each of the plurality of communication devices stores system information. When any one of the communication devices is disconnected from the higher- (Continued)

level communication device, the disconnected communication device searches for another communication device using the system information and makes reconnection to the communication device detected by the search.

17 Claims, 11 Drawing Sheets

(51) Int. Cl.
*H04W 40/34* (2009.01)
*H04W 84/12* (2009.01)
*H04W 84/18* (2009.01)
*H04W 88/04* (2009.01)

(56) References Cited

U.S. PATENT DOCUMENTS

| | | | |
|---|---|---|---|
| 2005/0174962 A1* | 8/2005 | Gurevich | H04W 88/06 370/328 |
| 2006/0034235 A1 | 2/2006 | Yamane | |
| 2006/0114881 A1* | 6/2006 | Chari | H04L 45/125 370/351 |
| 2008/0043637 A1 | 2/2008 | Rahman | |
| 2009/0059934 A1* | 3/2009 | Aggarwal | H04L 12/462 370/401 |
| 2009/0116411 A1* | 5/2009 | Castagnoli | H04W 48/16 370/256 |
| 2010/0260146 A1* | 10/2010 | Lu | H04L 12/4633 370/331 |
| 2011/0032842 A1* | 2/2011 | Patil | H04L 12/2838 370/254 |
| 2011/0032913 A1* | 2/2011 | Patil | H04W 72/08 370/338 |
| 2015/0156815 A1* | 6/2015 | Pang | H04W 84/12 370/338 |
| 2016/0007273 A1* | 1/2016 | Farid | H04W 48/16 370/329 |

FOREIGN PATENT DOCUMENTS

| | | |
|---|---|---|
| JP | 2003101546 A | 4/2003 |
| JP | 2006081164 A | 3/2006 |
| JP | 2008066992 A | 3/2008 |
| JP | 2014175747 A | 9/2014 |

OTHER PUBLICATIONS

International Search Report issued in Intl. Appln. No. PCT/JP2016/074191 dated Nov. 8, 2016. English translation provided.

Written Opinion issued in Intl. Appln. No. PCT/JP2016/074191 dated Nov. 8, 2016.

Extended European Search Report issued in European Appln. No. 16837169.8 dated Jan. 29, 2019.

* cited by examiner

FIG. 4

SYSTEM MANAGEMENT TABLE (DEVICE LIST, AP LIST)

SYSTEM ID = 01

| DEVICE ID | MAC ADDRESS | IP ADDRESS | NUMBER OF HOPS | AP ACTIVATION | NUMBER OF CHILDREN | ACTIVE |
|---|---|---|---|---|---|---|
| 00 | xx-xx-xx-xx-xx-xx<br>yy-yy-yy-yy-yy-yy | 192.168.0.1<br>192.168.1.1 | 0 (ROOT) | PRESENT | 2 | 1 |
| 01 | xx-xx-xx-xx-xx-xx<br>yy-yy-yy-yy-yy-yy | 192.168.0.2<br>192.168.1.2 | 1 (NODE) | PRESENT | 1 | 1 |
| 02 | xx-xx-xx-xx-xx-xx<br>yy-yy-yy-yy-yy-yy | 192.168.0.3<br>192.168.1.3 | 2 (LEAF) | ABSENT | 0 | 1 |
| 03 | xx-xx-xx-xx-xx-xx<br>yy-yy-yy-yy-yy-yy | 192.168.0.4<br>192.168.1.4 | 99 (BRANCH) | ABSENT | 0 | 1 |
| EXTERNAL ACCESS POINT INFORMATION | SSID | PASS PHRASE | SECURITY TYPE | BSSID | | |

FIG. 5

AUDIO CONTROL TABLE

SYSTEM ID = 01

| DEVICE ID | IP ADDRESS | MODEL | INSTALLATION PLACE | VARIOUS SETTING INFORMATION | ACTIVE |
|---|---|---|---|---|---|
| 00 | 192.168.0.1 | AV RECEIVER | LIVING | ----- | 1 |
| 01 | 192.168.0.2 | PLAYER | LIVING | ----- | 1 |
| 02 | 192.168.0.3 | SPEAKER | DINING | ----- | 1 |
| 03 | 192.168.0.4 | SPEAKER | BED ROOM | ----- | 1 |

COMMUNICATION SYSTEM, COMMUNICATION DEVICE, AND METHOD FOR RECONNECTING COMMUNICATION SYSTEM

CROSS REFERENCE TO RELATED APPLICATIONS

This application is a continuation of PCT application No. PCT/JP2016/074191, which was filed on Aug. 19, 2016 based on Japanese Patent Application (No. 2015-162328) filed on Aug. 19, 2015, the contents of which are incorporated herein by reference.

BACKGROUND OF THE INVENTION

1. Field of the Invention

This disclosure relates to an audio system (communication system) in which a plurality of audio devices (communication devices) is connected using a network.

2. Description of the Related Art

In an audio system composed of a plurality of audio devices, the respective audio devices have conventionally been connected mutually with analog or digital audio cables. In recent years, for the purpose of eliminating entangled cable groups and raising the degree of freedom in the form of the connection, it is conceivable that the respective devices are connected via a network (a wireless network in particular) and that voice signals and command messages are transmitted and received by packets.

Although audio cables are required for all the input and output terminals of devices, the connection of the cables is completed by physically connecting the cables to the terminals of the devices. On the other hand, in a wireless network, as described in JP-A-2003-101546 for example, the setting of, for example, an SSID and a password is required, whereby this setting work is more complicated than the connection of the cables. Furthermore, for example, in the case that the access point at the destination of the connection stops, it is necessary to change the destination of the connection and to make reconnection; however, this work is also troublesome as in the case of the first connection.

SUMMARY OF THE INVENTION

Accordingly, an object of this disclosure is to provide a communication system composed of a plurality of communication devices connected using a network, wherein, even if a communication device is disconnected from the network, the communication device can make reconnection automatically (1) The communication system according to this disclosure is a communication system including:
a plurality of communication devices connected so as to be able to mutually communicate and to constitute a network;
each of the plurality of communication devices comprising:
a first wireless communication section functioning as a wireless relay device of the network: and
a second wireless communication section functioning as a slave unit to be connected to another communication device in the network, wherein:
the second wireless communication section of a lower-level communication device is configured to access the first wireless communication section of a higher-level communication device, whereby the higher-level communication device and the lower-level communication device are connected so as to constitute the network,
each of the plurality of communication devices stores system information including connection information for connection to the first wireless communication section of each of the plurality of communication devices constituting the network, and
when any one of the plurality of communication devices is disconnected from the higher-level communication device being connected thereto, the disconnected communication device is configured to search for another communication device constituting the network using the system information and to make reconnection to the communication device detected by the search.

The communication device according to this disclosure is a communication device including:
a first wireless communication section functioning as a wireless relay device of a network;
a second wireless communication section functioning as a slave unit to be connected to another communication device in the network;
a storage section configured to store system information including connection information for connection to the first wireless communication section of the other communication device constituting the network; and
a control section, wherein:
when the second wireless communication section is disconnected from the first wireless communication section of a higher-level communication device being connected thereto, the control section is configured to search for another communication device constituting the network using the system information and to make reconnection to the other communication device detected by the search.

The method for reconnecting a communication system according to this disclosure is a method for reconnecting a communication system, a plurality of communication devices being connected so as to constitute a network; each of the plurality of communication devices being equipped with a first wireless communication section functioning as a wireless relay device of the network and a second wireless communication section functioning as a slave unit to be connected to another communication device in the network; the second wireless communication section of a lower-level communication device accesses the first wireless communication section of a higher-level communication device, whereby the higher-level communication device and the lower-level communication device are connected so as to constitute the network; and each of the plurality of communication devices stores system information including connection information for connection to the first wireless communication section of each communication device constituting the network, wherein:
when any one of the plurality of communication devices is disconnected from the higher-level communication device being connected thereto, the disconnected communication device searches for another communication device constituting the network using the system information and makes reconnection to the communication device detected by the search.

With this disclosure, even in the case that a communication device having been connected to a network is disconnected from a higher-level device, the device can search for another communication device and can make reconnection automatically.

BRIEF DESCRIPTION OF THE DRAWINGS

FIG. 4 is a view showing an example of a system management table to be set in a host device and the controller;

FIG. 5 is a view showing an example of an audio control table to be set in the controller;

DETAILED DESCRIPTION OF THE EXEMPLARY EMBODIMENTS

Figure 1:
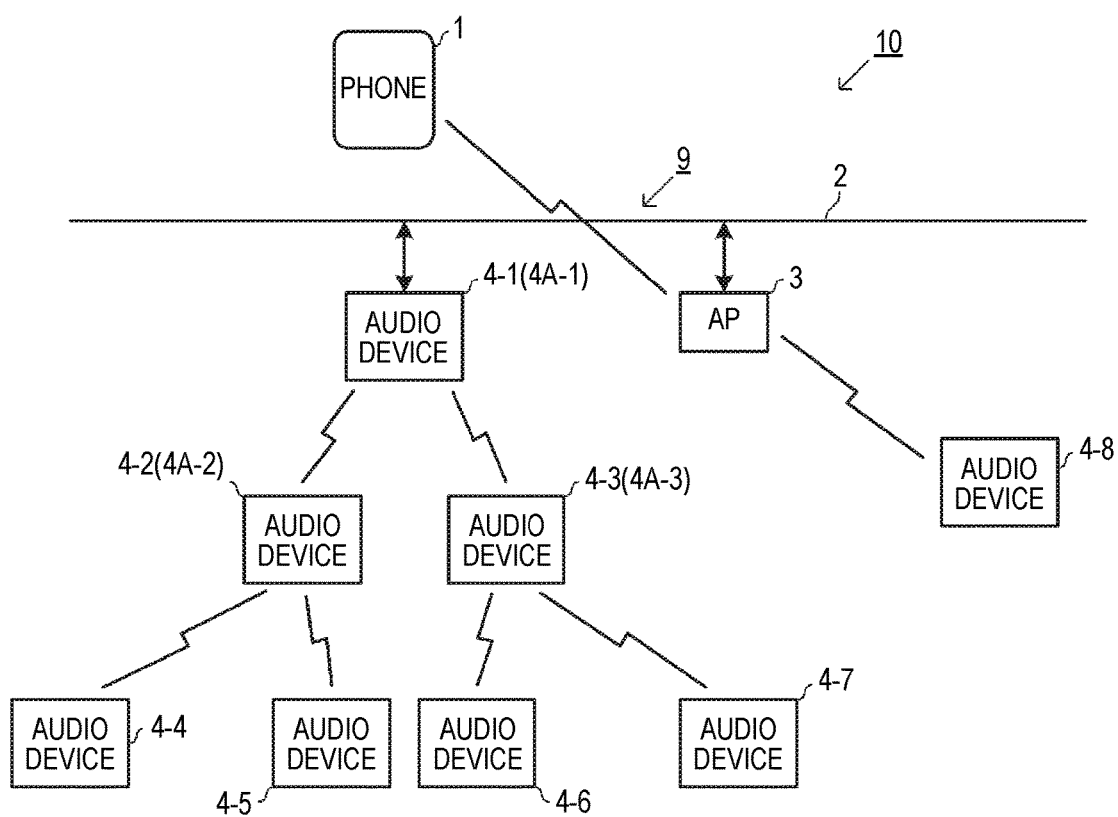
FIG. 1 is a view showing a configuration of an audio system to which this disclosure is applied.

FIG. 1 is a view showing a configuration of an audio system to which this disclosure is applied. An audio system 10 has a plurality of audio devices 4 (4-1 to 4-8) connected using a network 9 including a wired LAN 2 and an access point (external access point) 3 and also has a multifunctional mobile phone 1 (hereafter referred to as a mobile phone) that functions as a controller 1. The respective audio devices 4 mutually transmit and receive audio signals via the network 9. The controller 1 transmits command messages to the audio devices 4 via the network 9.

Each audio device 4 (hereafter also referred to as a component device) constituting the audio system 10 has a wired LAN function and two wireless LAN functions. The audio device 4 can activate an access point by using one of the two wireless LAN functions. The access point activated by the audio device 4 is referred to as an internal access point 4A. To the internal access point 4A, a lower-level audio device 4 is connected. The internal access point 4A operates in a stealth mode usually (except for initial connection time described later), whereby its existence is hardly known by other devices. The other wireless LAN function is a function operating as a wireless LAN slave unit and is connected to the internal access point 4A of a higher-level audio device 4 or the external access point 3.

The access point (external access point) 3 is connected to the wired LAN 2. The audio device 4-1 is connected to the wired LAN 2 with a cable. The audio devices 4-2 and 4-3 are connected to the internal access point 4A-1 of the higher-level audio device 4-1 with a wireless LAN. The audio devices 4-4 and 4-5 are connected to the internal access point 4A-2 of the higher-level audio device 4-2 with a wireless LAN. Furthermore, the audio devices 4-6 and 4-7 are connected to the internal access point 4A-3 of the higher-level audio device 4-3 with a wireless LAN. The audio device 4-8 is connected to the external access point 3.

In this embodiment, the network 9 is composed of the wired LAN 2 and the wireless LANs including the external access point 3 and the internal access points 4A. Ethernet (registered trade mark: IEEE 802.3), for example, is used for the wired LAN 2, and Wi-Fi (IEEE 802.11g), for example, is used for the wireless LANs.

The audio devices 4 are respectively referred to as a root device, a node device, a leaf device and a branch device depending on the form of the connection to the wired LAN 2. The root device is the highest-level device connected to the wired LAN 2 directly (with a cable); in FIG. 1, the audio device 4-1 is a root device. The root device is an audio device that is first registered at the time when the audio system 10 is constructed and is used as the base point of the audio system 10. The root device activates its internal access point 4A so that lower-level audio device 4 is connected to the network and participates in the audio system 10. Music information to be reproduced by the audio devices 4 (node devices and leaf devices) connected to the root device and the subsequent devices is transmitted via this access point.

A node device is a middle-level device connected to a root device (the internal access point 4A of the root device) via a wireless LAN; in FIG. 1, the audio devices 4-2 and 4-3 are node devices. The node device activates its internal access point 4A so that lower-level audio devices 4 are connected to the network and participate in the audio system 10. Music information to be reproduced by the audio devices 4 connected to the node device and the subsequent devices (leaf devices) is transmitted via this access point.

A leaf device is a lower-level device connected to a node device (the internal access point 4A of the node device) via a wireless LAN; in FIG. 1, the audio devices 4-4, 4-5, 4-6 and 4-7 are leaf devices. Although the leaf device does not activate its internal access point 4A, the leaf device may activate its internal access point.

A branch device, separated from the devices in a tree in which the root device is used as its apex, is an audio device 4 that is connected to the external access point 3 via a wireless LAN and communicates with the other audio devices 4 in the audio system 10 via the wired LAN 2; in FIG. 1, the audio device 4-8 is a branch device. Although the branch device does not activate its internal access point 4A, the branch device may activate its internal access point.

In this audio system, for high-quality audio signal transmission, up to two node devices are allowed to be connected to the root device. Furthermore, up to two leaf devices are allowed to be connected to each node device. Moreover, the hierarchy levels of the connection using the internal access points 4A are assumed to be up to three levels: root device, node device and leaf device. Hence, up to seven audio devices including the root device can be connected by the tree of the wireless LANs in which the root device is used as its apex. To the tree shown in FIG. 1, the maximum connectable number (seven) of the audio devices 4 (4-1 to 4-7) are connected. What's more, although the number of the branch devices is not limited, as the devices to be controlled by the controller 1, the total number of the audio devices 4 in the audio system 10 is limited to 10. However, in this disclosure, for example, the maximum number of the hierarchy levels of the tree and the maximum number of lower-level devices that can be connected to each audio device 4 are not limited to those specified in this embodiment.

Figure 2:
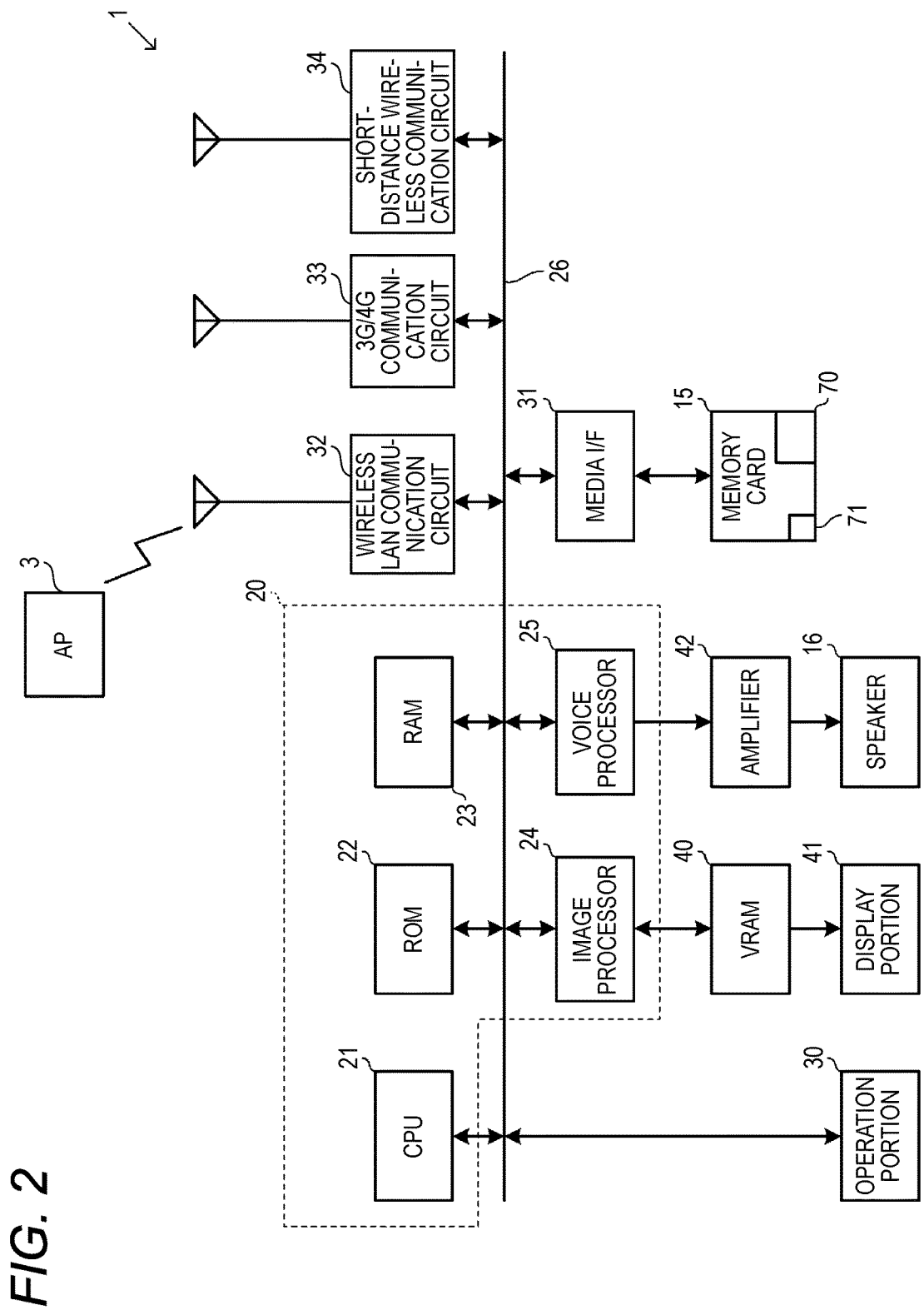
FIG. 2 is a block diagram showing a mobile phone which functions as a controller and to which this disclosure is applied.

The mobile phone 1 functions as an audio system controller (hereafter referred to as a controller) 1 by the activation of an audio system control program 70 (see FIG. 2). The mobile phone 1 (controller 1) communicates with the audio devices 4 belonging to the audio system 10 via the network 9. By virtue of this communication, the controller 1 controls, for example, an audio source (for example, as to whether which music piece is reproduced by which audio device and whether which music piece is distributed to which audio device 4) to be reproduced in the audio system 10 and the volume thereof. Furthermore, each audio device 4 communicates with the audio devices 4 in the system to which the audio device itself belongs via the network 9, thereby mutually transmitting and receiving audio signals.

Next, the configuration of the mobile phone 1 will be described referring to the block diagram of FIG. 2. The mobile phone 1 is a multifunctional phone, a so-called smart phone. The mobile phone 1 has the 3G/4G communication function for mobile communication networks, the wireless LAN (Wi-Fi) communication function and the Bluetooth (registered trademark) communication function. By the activation of the audio system control program 70 being used as an application program, the mobile phone 1 functions as the controller 1, communicates with the audio devices 4 of the audio system via the external access point 3 of the network, and transmits the command message corresponding to the operation of the user to the audio devices 4, thereby controlling the audio system.

On a bus 26, the mobile phone 1 has a control section 20, an operation section 30, a media interface 31, a wireless LAN communication circuit 32, a 3G/4G communication circuit 33, and a short-distance wireless communication circuit 34 capable of carrying out the Bluetooth (registered trademark) communication. The control section 20 includes a CPU 21, a ROM (flash memory) 22, a RAM 23, an image processor 24, and a voice processor 25. A video RAM (VRAM) 40 is connected to the image processor 24, and a display section 41 is connected to the VRAM 40. The display section 41 includes a liquid crystal display. Standby screens, telephone numbers, etc. are shown on the display. Furthermore, a screen for controlling the audio devices 4 is displayed in the case that the mobile phone functions as the controller 1. An amplifier 42 including a D/A converter is connected to the voice processor 25, and a speaker 16 is connected to the amplifier 42.

The image processor 24 is equipped with a GPU (graphics processing unit) for generating various images, such as standby screens, telephone numbers, etc. In the case that the audio system control program 70 is activated, the image processor 24 generates an image of an audio controller according to the instruction of the CPU 21 and develops the image on the VRAM 40. The image developed on the VRAM 40 is displayed on the display section 41.

The voice processor 25 has a DSP (digital signal processor) for encoding/decoding speech voice. The voice processor 25 outputs decoded/generated voice to the amplifier 42. The amplifier 42 amplifies this voice signal and outputs the signal to the speaker 16.

The wireless LAN communication circuit 32 carries out wireless communication with a router according to a standard, such as IEEE 802.11g, and communicates with the audio devices 4 via the access point 3. The 3G/4G communication circuit 33 carries out voice speech communication and data communication via mobile phone communication networks. The short-distance wireless communication circuit 34 communicates with other devices conforming to the Bluetooth (registered trademark) and transmits and receives audio signals, for example.

The operation section 30 includes a touch panel formed on the display section 41 and detects a touch operation and a flick operation on the touch panel. When the audio system control program 70 is activated, a plurality of operation elements, such as a setup button and a scan button, is displayed on the display section 41. The operation section 30 detects the touch operation of the user and the coordinates thereof on the touch panel and judges whether which operation element is operated.

A memory card 15 is connected to the media interface 31. The memory card 15 is, for example, a micro SD card. The audio system control program 70 is stored in the memory card 15 or the ROM 22. In this embodiment, it is assumed that the audio system control program 70 is stored in the memory card 15 as shown in FIG. 2. However, the audio system control program 70 may be downloaded by the 3G/4G or wireless LAN data communication or may be stored in the ROM 22 or the memory card 15 in advance. Furthermore, a storage area 71 for storing the configuration of the audio system is set in the memory card 15.

In the ROM 22, basic programs for executing the speech and application programs of the mobile phone 1 are stored in the ROM 22. Furthermore, the ROM 22 is a flash memory and can store, for example, downloaded application programs in addition to the basic programs. In the RAM 23, a work area that is used when the CPU 20 executes the audio system control program 70 is set.

Next, the configuration of the audio device 4 will be described referring to FIG. 3. The audio device 4 has a control section 50, an audio processing section 51 and an operation section 59, and also has two wireless LAN communication sections (RF modules) 56 and 57 and a wired LAN communication section 58. The operation section 59 has a connect button 59A in addition to a volume operation element (not shown). The control section 50 has a CPU and a memory and stores an audio system program. The control section 50 controls the operations of the audio processing section 51, the wireless LAN communication sections 56 and 57 and the wired LAN communication section 58 by using the audio system program. Furthermore, when the connect button 59A is pressed, the control section 50 carries out an initial connection operation, i.e., an operation for connecting this audio device 4 to the network 9. The details of the initial connection operation will be described later.

The wireless LAN communication section 56 carries out wireless communication with the external access point 3 or the internal access point 4A of a higher-level audio device 4 according to a wireless LAN standard, such as IEEE 802.11g. Furthermore, the other wireless LAN communication section 57 is activated as an access point (internal access point 4A) and relays the other audio devices (for example, the audio devices 4-2 and 4-3) to the wired LAN 2. Moreover, the wireless LAN communication section 57 is also activated as a temporary access point for initial connection at the initial connection time of this audio device 4 and communicates with the controller 1 (mobile phone 1). The operation at the initial connection time will be described later. The two wireless LAN communication sections 56 and 57 may be achieved by operating a single piece of hardware in time division. The wired LAN communication section 58 has a cable connector and carries out communication via the wired LAN 2 conforming to a communication standard, such as IEEE 802.3 and via the access point 3. The controller (mobile phone) 1 is connected to the access point 3, and the control section 50 communicates with the controller 1 via the network 9 to transmit operation states and to receive command messages.

The SSID and the password of the internal access point 4A are composed of character strings that can be derived from the MAC address of the wireless LAN communication section 57. For example, the octet representation of the MAC address is used as the SSID, and the lower three octets (model ID+serial number) are used as the password. With this setting, an audio device newly participating in the audio system can find an internal access point 4A on the basis of the SSID, that is, on the basis of the vender ID and the model ID of the MAC address, and the audio device can generate a password by itself and can make connection to the internal access point 4A. Hence, in the case of the connection to the internal access point 4A, the input of the SSID and the password by the user can be omitted. However, the method for generating the SSID and the password of the internal access point 4A is not limited to the method described above.

The audio processing section 51 has a tuner 52, an audio circuit 53 and a power amplifier 54. The tuner 52 receives an audio signal from an FM broadcast or the Internet and inputs the signal to the audio circuit 53. The audio circuit 53 carries out processes, such as equalizing and volume adjustment, for the input audio signal, and outputs this processed audio signal to the power amplifier 54. The power amplifier 54 amplifies the input audio signal and outputs the audio signal to a speaker 55 connected externally. The speaker 16 emits the input audio signal as sound.

Figure 3:
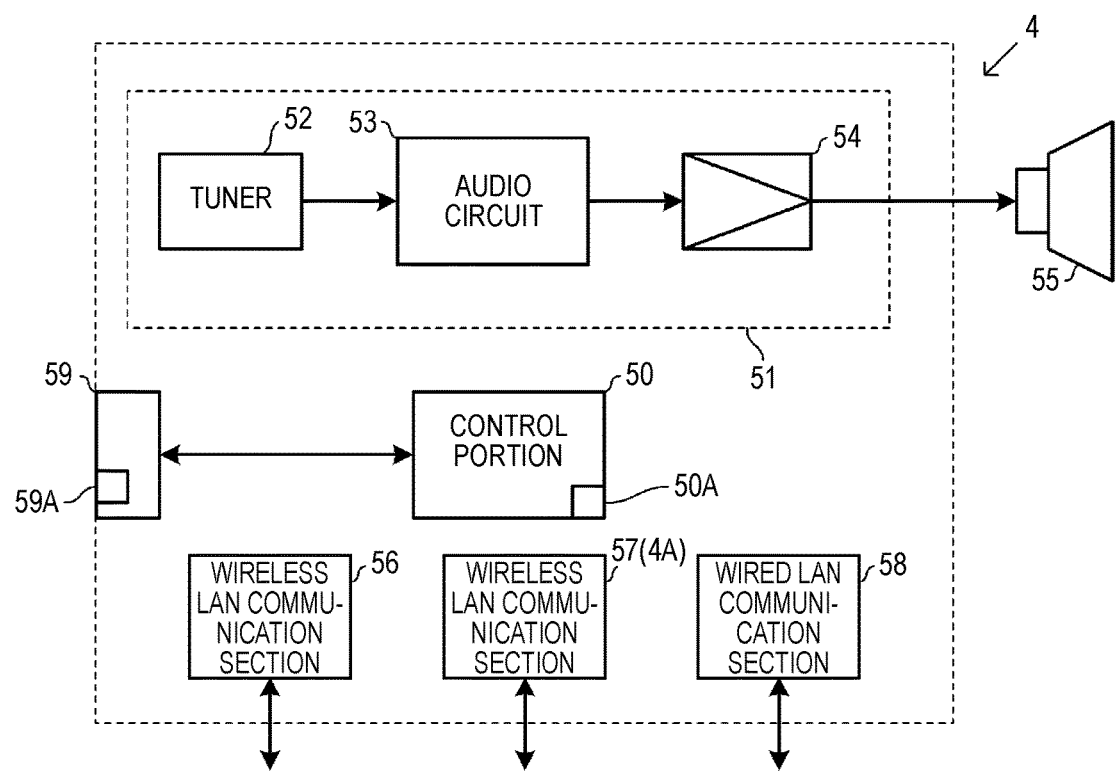
FIG. 3 is a block diagram showing an audio device to which this disclosure is applied.

Although the audio devices 4-1 to 4-8 may be different from one another, the basic configurations of the communication function and the audio signal processing function thereof are those shown in FIG. 3.

Each of FIGS. 4 and 5 is a view showing an example of a table for managing the audio system. FIG. 4 is a system management table for managing the connection form of the respective audio devices 4 in the network 9. Furthermore, FIG. 5 is an audio control table for managing the operations of the respective audio devices 4 in the audio system 10. The system management table is mainly used by the root device 4-1 to manage network connection. Furthermore, the audio control table is mainly used by the controller 1 to control the reproduction of audio sources.

The system management table stores the connection form of the respective audio devices 4 (component devices) constituting the audio system 10 and is prepared by the controller 1 at the time when the audio system 10 is constructed. Furthermore, when a new audio device 4 is added to the audio system 10, the controller 1 adds this audio device 4 and makes an update. The prepared system management table or the added/updated system management table is transmitted from the controller 1 to the root device 4-1. After that, the system management table is updated by the root device 4-1 during the operation of the audio system 10 each time the disconnection or reconnection of any one of component devices occurs. Moreover, the root device 4-1 periodically transmits all or part of the contents of the system management table to each component device and the controller 1 as system information. Hence, each component device and the controller 1 can hold the updated system information at all times. The detailed operation for the above-mentioned transmission of the system information will be described later.

The system management table is identified by the system ID for identifying this audio system 10. Each component device stores, corresponding to the device ID of each device, information, for example, the MAC address (i.e., the MAC address of the wireless LAN communication section 56/57) on the higher-level side (slave unit side)/lower-level side (internal access point side); the IP address (i.e., the IP address of the wireless LAN communication section 56/57) on the higher-level side/lower-level side; the number of connection stages (the number of HOPs) from the root device 4-1; the presence/absence of the activation of the internal access point; the number of lower-level devices (the number of children) connected to the internal access point 4A; and operation state (communication possible/impossible) information (Active). If any one of the component devices is disconnected from the root device 4-1 (communication is interrupted), the column of the device is made inactive (communication impossible); if the component device is reconnected, the column is updated with the reconnected contents and made active again. The details of the operations relating to the above-mentioned disconnection and reconnection will be described later.

Although each component device has its own IP address, a multicast address is set for this audio system 10 as a multicast group. By the transmission of the IP packet of the above-mentioned system information to this multicast address, this system information packet can be received by all the component devices of the audio system 10. Although the system information packet may be transmitted to the IP address of each component device by unicast, the load on the network 9 can be reduced by multicast transmission.

The audio control table of FIG. 5 stores, corresponding to the device ID of each device, various kinds of setting information, for example, the IP address (the IP address of the wireless LAN communication section 56) on the higher-level side of each component device, model, installation place, operation state information, volume value, and display name. Each column of the audio control table is made to correspond to each column of the system management table by the device ID. The controller 1 prepares a control screen on the basis of the contents of this audio control table and accepts the control of each component device by the user.

In the case that the audio system 10 is constructed, the root device 4-1 is first set and the audio system 10 is constructed. Then, the audio devices 4 other than the root device 4-1 are added to this audio system 10. The user carries out operation according to the following procedure. The audio device 4-1 serving as the root device is connected to the wired LAN 2 with a cable. On the mobile phone, the controller 1 is activated in a setup mode. The connect button 59A of the audio device 4-1 is pressed. After the above-mentioned operations are carried out by the user, the controller 1 and the root device 4-1 mutually communicate, and the audio system 10 is constructed automatically. After that, in the case that a new audio device 4 is added to the audio system 10, the user activates the controller 1 in the setup mode, turns on the power source of the audio device 4 to be added (activates the wireless LAN communication sections 56 and 57), and presses the connect button 59A, whereby the audio device 4 communicates with the controller 1 and the root device 4-1, a password is automatically generated from the above-mentioned SSID, whereby the audio device is automatically added to the audio system 10.

The communication procedures between the controller 1 and the audio device 4 at the time of the construction of the audio system 10 and at the time of the addition of the audio device 4 to the audio system 10 will be described referring to FIGS. 6 to 9.

Figure 6:
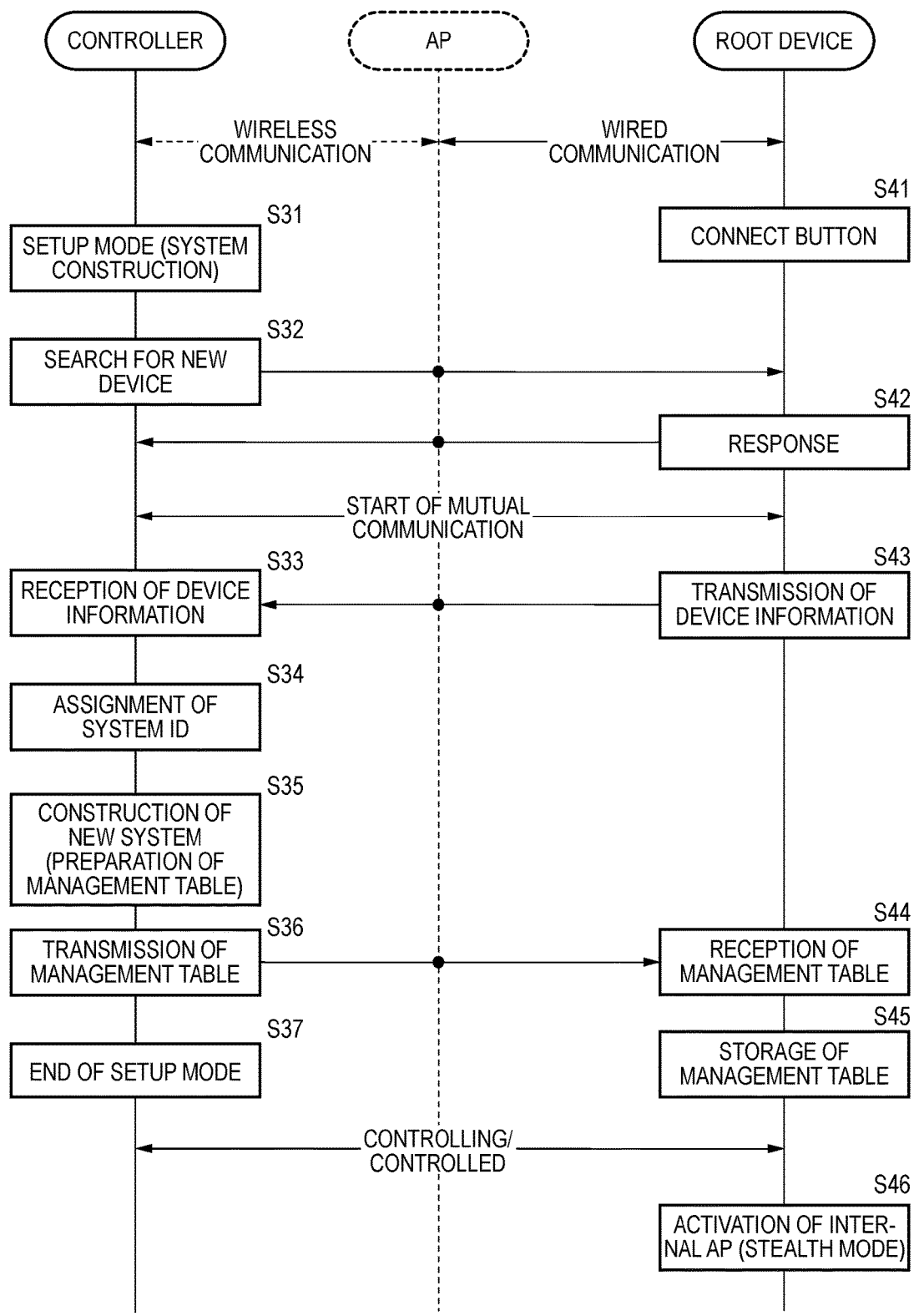
FIG. 6 is a view showing a procedure for communication between the controller and an audio device.

FIG. 6 is a view showing the communication procedure between the controller 1 and the audio device 4-1 serving as the root device in the case that the audio system 10 is newly constructed. The audio system control program 70 has been activated and the mobile phone 1 functions as the controller 1. When the controller 1 enters a setup mode by user operation (at S31), a guidance screen for urging the user to press the connect button 59A of the audio device 4-1 is displayed on the display section 41. The user presses the connect button 59A of the audio device 4-1 according to the guidance on this screen (at S41). Next, the controller 1 searches for a new audio device connected to the wired LAN 2 (at S32). This search is carried out by transmitting a message requesting a reply, such as polling. The audio device 4-1 responds to this search (at S42). Hence, the controller 1 and the audio device 4-1 mutually communicate via the wired LAN 2 and the access point 3.

The audio device 4-1 transmits its own device information (the MAC address and IP address of the wireless LAN communication section) to the controller 1-1 (at S43). The controller 1 constructs a new audio system 10 by using this audio device 4-1 as the root device. A system ID is assigned to the audio system 10 (at S34), the system management table and the audio control table shown in FIGS. 4 and 5 are prepared, and the audio system 10 in which the audio device 4-1 carrying out communication at present is used as the root device is constructed (at S35). When the audio system 10 is constructed, the system management table is transmitted to the audio device 4-1 serving as the root device (at S36), and the setup mode is ended (at S37). The audio device 4-1 receives this system management table (at S44) and stores the table (at S45). Hence, the audio system 10 wherein the audio device 4-1 is used as the key component is constructed. Hereafter, for example, a music piece to be reproduced and its volume are controlled by the controller 1. The audio device 4 activates its access point in the stealth mode (at S46).

Figure 7:
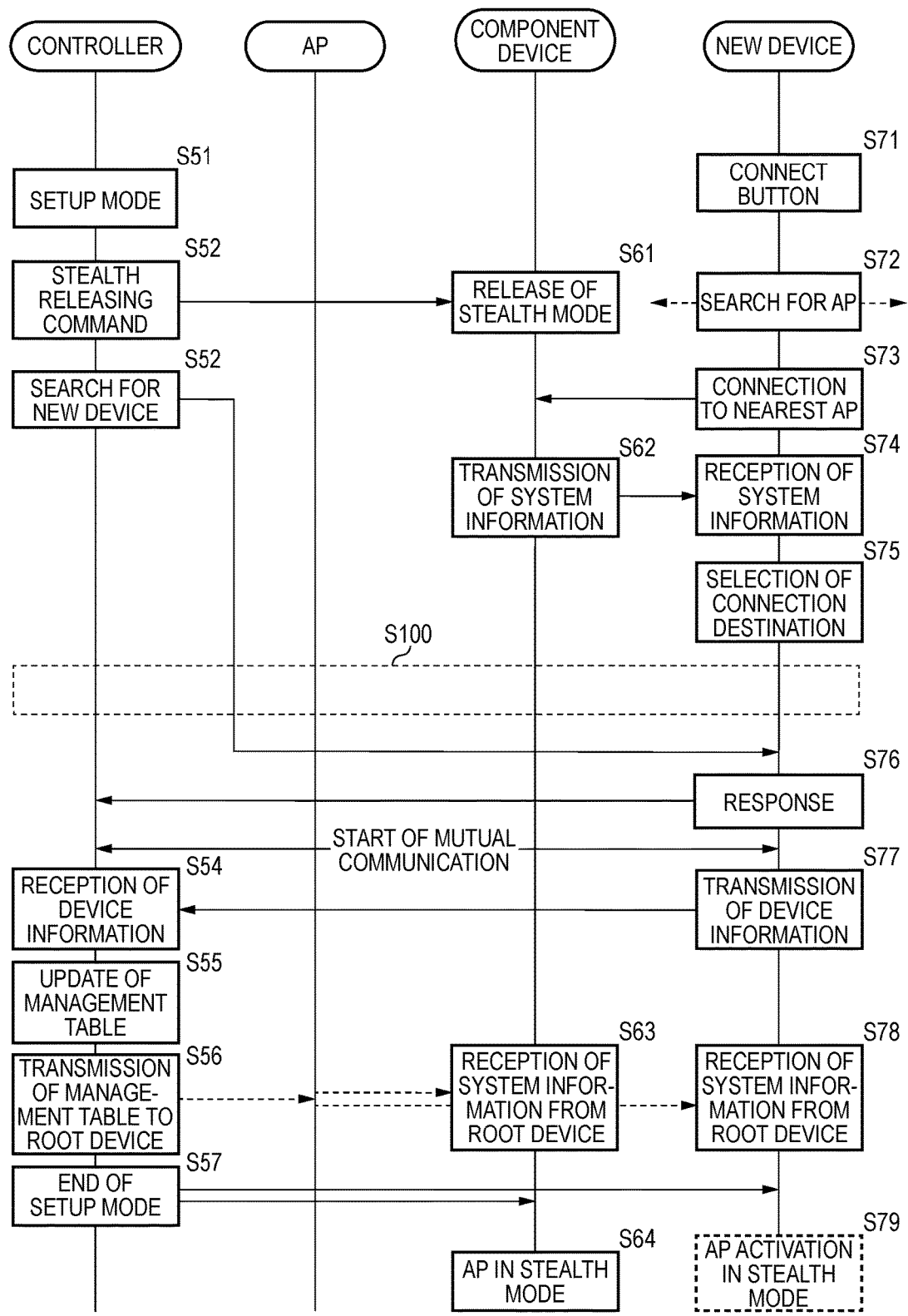
FIG. 7 is a view showing a procedure for communication between the controller and an audio device.

FIG. 7 is a view showing the communication procedure in the case that a new audio device is added to the constructed audio system 10. The component device is the audio device 4 having already been serving as the component of the audio system 10 and is the root device or a node device activating its internal access point 4A. The new device is an audio device 4 to be added newly.

When the mobile phone 1 functioning as the controller 1 enters a setup mode by user operation (at S51), a guidance screen for urging the user to press the connect button 59A of the audio device 4 (new device) is displayed on the display section 41. The user presses the connect button 59A of the new device according to the guidance on this screen (at S71). The controller instructs the component device serving as the audio device 4 having already been registered to release the stealth mode of its internal access point 4A (at S52). Hence, the component device releases the stealth mode of the internal access point 4A and transmits a beacon frame notifying its existence, whereby the passive scanning for the new device is made possible (at S61). Next, the controller 1-1 starts the search for a new device (at S53).

When the connect button 59A is pressed by the user (at S71), the new device enters an initial connection mode and searches (carries out passive scanning) for connectable access points (at S72). The new device finds the internal access points 4A of the component devices as connectable access points by this search. As described above, the internal access point 4A has an SSID according to which the internal access point 4A can be identified as a device belonging to the audio system 10 as viewed from the new device, and a password is generated from the SSID (or MAC address), whereby connection is made possible. The new device selects the nearest (most connectable) access point from the found internal access points 4A and makes temporary connection to the selected access point 4A by using the SSID and the generated password (at S73). This connection is a temporary connection for obtaining system information and is not the regular connection for participating in the audio system 10. After that, the system information of the audio system 10 at the present time is obtained from the internal access point 4A (component device) to which the connection is made (at S62, S74). The system information is information including all or part of the contents of the system management table, and the information is periodically updated by the root device 4-1 and distributed to the other component devices. On the basis of the obtained system information, the new device selects the optimal access point for participation in the audio system 10 (at S75). This selection is carried out on the basis of, for example, the radio wave intensity of each access point, the number of connection stages from the root device 4-1, and the number of component devices connected to the access point, and an access point that is assumed to be satisfactory in communication condition is selected.

Figure 8:
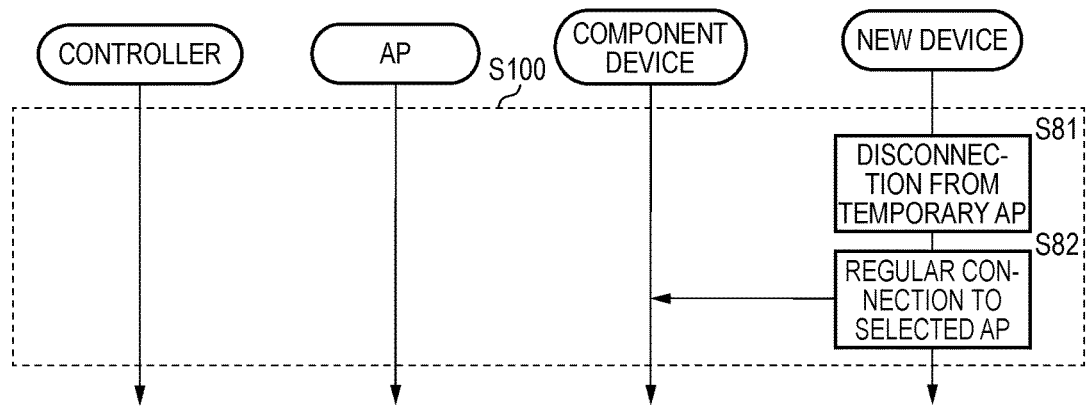
FIG. 8 is a view showing a procedure for communication between the controller and an audio device.
Figure 9:
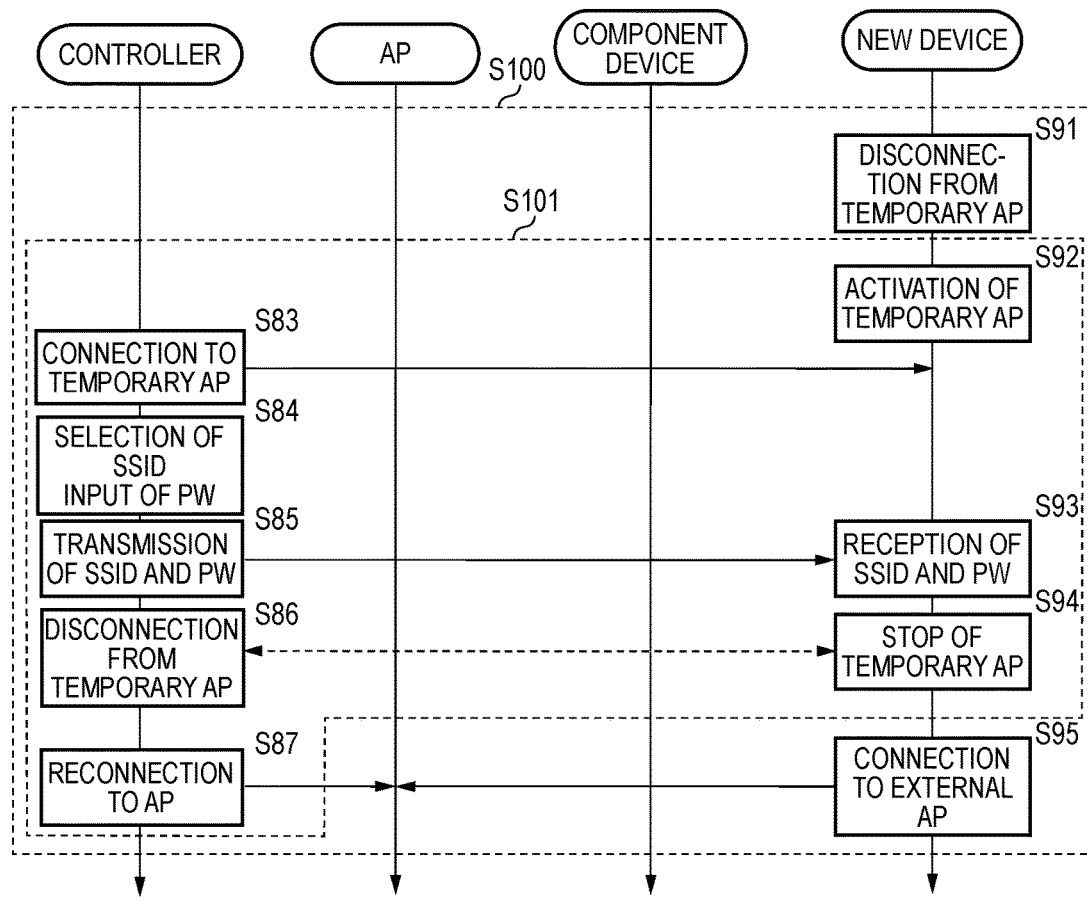
FIG. 9 is a view showing a procedure for communication between the controller and an audio device.

The example of FIG. 7 (the example in which S100 is not carried out) shows the flow of a case in which a judgment is made that the internal access point 4A used for the temporary connection is optimal even in the regular connection and the destination of the connection is not changed. This corresponds to, for example, a case in which the device is connected to the internal access point 4A-1 of the root device 4-1. In the case that the destination of the connection in the regular connection is changed from the internal access point 4A used for the temporary connection, the procedure shown in FIG. 8 or FIG. 9 is carried out in the section of S100 shown in FIG. 7. When the regular connection is completed (after the temporary connection is used as the regular connection in the case shown in FIG. 7), the new device receives a new device search message (at S53) from the controller 1 and responds to this message (at S76). The new device can thus communicate with the controller 1. Hence, in the new device, for example, a music piece to be reproduced and its volume are controlled by the controller 1, and the new device becomes a component of the audio system 10.

The new device transmits its own device information (the MAC address and IP address of the wireless LAN communication section) to the controller 1 (at S77). The controller 1 receives this device information (at S54), registers this new audio device 4 in the system management table and the audio control table and updates these tables (at S55). The controller 1 transmits the updated system management table to the root device 4-1 (at S56) and ends the setup mode (at S57). The root device 4-1 periodically distributes the system information including all or part of the contents of the system management table as a connection confirmation message that is described referring to FIGS. 10A and 10B to the other component devices. Although the notification indicating the end of the setup mode is transmitted from the controller 1 to all the audio devices 4, it may be possible that the controller 1 transmits the notification to the root device 4-1 and then the root device 4-1 transmits the notification to the other audio devices 4 of the audio system 10.

The new device having received the system information from the root device 4-1 stores this system information (at S78). The new device then activates its internal access point 4A in the stealth mode (at S79). Furthermore, the component device having received the system information from the root device 4-1 updates, with this information, the system information stored therein (at S63). After that, the internal access point 4A is returned to the stealth mode (at S64). By the above-mentioned processes, the new device can be added to the constructed audio system 10. In both the component device and the new device, the internal access point 4A thereof is set to the stealth mode only in the case that the device is a root device or a node device, and the processes at S64 and S79 are not carried out in the case that the device is a leaf device or a branch device.

FIG. 8 is a view showing the communication procedure in the case that at S81 the new device disconnects the connection to the internal access point 4A used for the temporary connection and then makes reconnection to another access point 4A inside the tree. When another internal access point 4A is selected as the connection destination of the regular connection at S75 in FIG. 7, the new device disconnects the connection to the internal access point 4A used for the temporary connection at present (at S81), and the new device makes the regular connection to the selected internal access point 4A by using the address information of the system information (at S82). The processing then advances to S76 in FIG. 7.

FIG. 9 is a view showing the communication procedure in the case that at S91 the new device disconnects the connection to the internal access point 4A used for the temporary connection and then makes reconnection to the external access point 3 so as to serve as a branch device. When the external access point 3 is selected as the connection destination of the regular connection at S75 in FIG. 7, the new device disconnects the connection to the internal access point 4A used for the temporary connection at present (at S91), and activates a temporary access point for use only at the initial connection time in a stand-alone state (at S92). In other words, an internal access point 4A that is not connected to the wired LAN 2 but connected to only the new device is activated. The controller 1 stores the SSID and the password of this temporary access point for initial connection in advance. More specifically, the SSID and the password have been written as data in the audio system control program 70 in advance. Hence, the controller 1 finds this temporary access point during the search for a new device started at S53, releases the connection to the external access point 3 once, and then makes connection to the temporary access point activated by the new device (at S83). The controller 1 has a high possibility that the SSID and the password of the external access point 3 cannot be obtained from the system program of the mobile phone 1; hence, the user is herein requested to input the SSID and the password of the external access point 3 (at S84). The input of the SSID may be carried out by a method wherein the list of connection destinations (SSIDs) that can be seen at the time is shown on the display and the user is made to select the SSID of the external access point 3. The user is made to input the password (usually shown on the main body of the external access point 3).

After that, this input connection information is transmitted to the new device that has activated the temporary access point (at S85). The new device receives this connection information (at S93). After transmitting the connection information (SSID and password) of the external access point 3 to the new device, the controller 1 releases the connection to the temporary access point (at S86). After receiving the connection information of the external access point 3 from the controller 1, the new device stops the temporary access point (at S94). The controller 1 makes connection again to the external access point 3, the connection to which has been released once (at S87). The new device also makes connection to the external access point 3 by using the obtained connection information (at S95). The controller 1 then returns to the procedure in FIG. 7 and searches for a new device (at S53), and the new device responds to this search (at S76). In the case that the connection information of the external access point 3 is included in the system information obtained from the component device used for the temporary connection, the processes (S83 to S87, S92 to S94) may merely be omitted, and the device may merely be reconnected to the external access point in a manner similar to that shown in FIG. 8.

As described above, the root device 4-1 periodically (once per two seconds) transmits the system information to the other audio devices (component devices) 4 of the audio system 10. The system information includes, for example, the MAC address and IP address of each component device (on the side of the internal access point); the number of connection stages (the number of HOPs) from the root device 4-1; the presence/absence of the activation of the internal access point; the number of lower-level devices connected to the internal access point 4A; and the connection information of the external access point 3. The root device 4-1 transmits this system information to each component device as an echo request packet (ping). This packet is hereafter referred to as a system information packet.

Figure 10A:
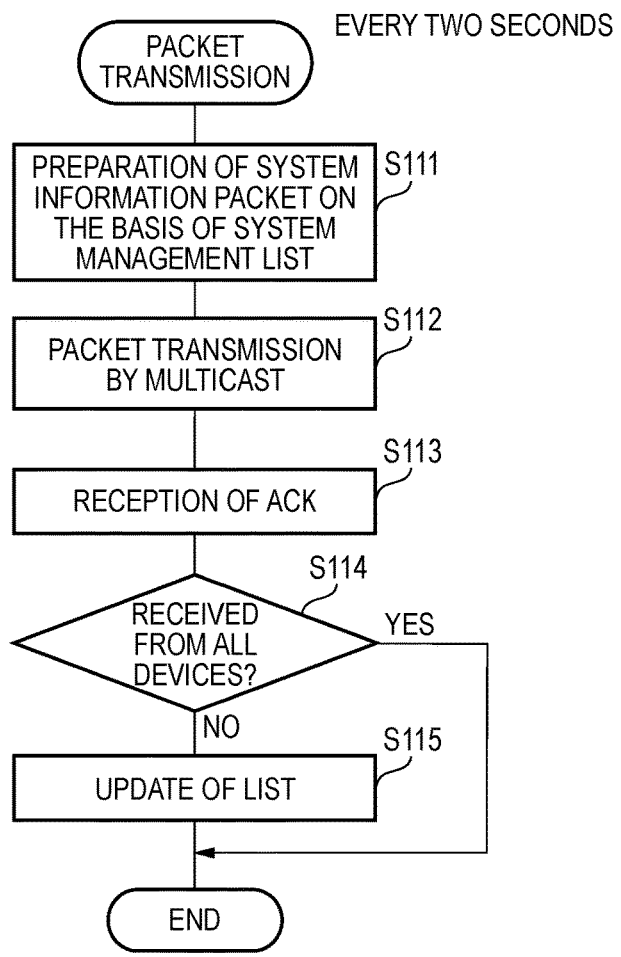
FIGS. 10A and 10B are flow charts showing the system information transmission operation of the host device.
Figure 10B:
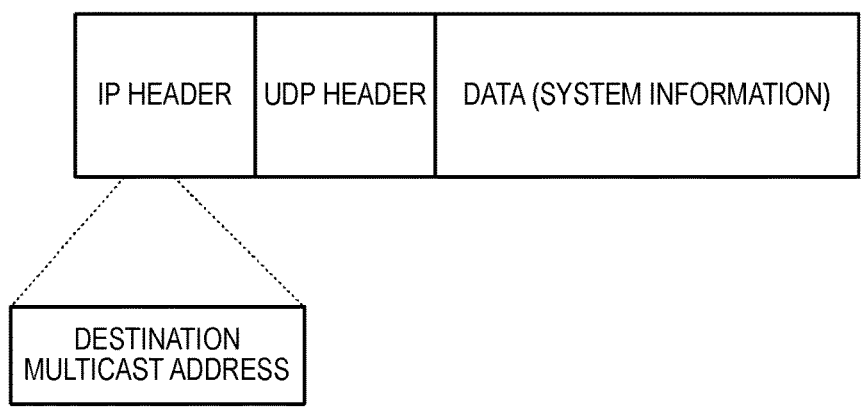

A system information packet transmitting process to be carried out periodically will be described referring to FIGS. 10A and 10B. In FIG. 10A, the root device 4-1 prepares a system information packet on the basis of its own system management table (at S111). The system information packet has a configuration of an IP packet including a UDP datagram in which the system information shown in FIG. 10B is used as a data body, and the multicast address having been set in this audio system 10 is written in the destination address of the IP header. The root device 4-1 transmits the system information packet to the multicast address given to this audio system 10. Upon receiving the system information packet, each component device updates its own system information with the system information included in this packet and returns, to the root device 4-1, a response packet (ACK) indicating that the component device has received the system information packet. The root device 4-1 receives the response packet from the component device (at S113) and judges whether a reply has been made from all the component devices (at S114). This process is simply ended in the case that the reply has been made from all the component devices (YES at S114). In the case that there is a component device that does not make the reply (NO at S114), the component device is rewritten as inactive and the system management table is updated (at S115). The next preparation of the system information packet is carried out according to the contents of the updated system management table. Hence, each component device can obtain the updated system information at all times. The contents of the updated management table are also notified to the controller 1.

Although the system information is transmitted by multicast in the explanations in FIGS. 10A and 10B, the information may be transmitted to each component device individually by unicast.

As situations in which the component device cannot return ACK to the root device 4-1, some cases are taken as examples: a case in which the device itself causes the fault, for example, the power source of the device itself is turned off (its plug is disconnected from the outlet) and a case in which a device higher in level in the tree causes the fault, for example, the power source of the device higher in level is turned off (its plug is disconnected from the outlet) or the radio wave condition for communication is unsatisfactory. In the case that the communication with the higher level component device (the internal access point 4A) is disconnected from the higher level component device, the component device (in particular, the node device, the leaf device) searches for another connectable access point and attempts reconnection automatically. The disconnection of the communication with the higher-level internal access point 4A can be judged, for example, by the fact that the above-mentioned system information packet is not transmitted, an encryption key update notice required for the process for maintaining the Wi-Fi communication is not sent, or there is no reply to a keep-alive packet.

Figure 11:
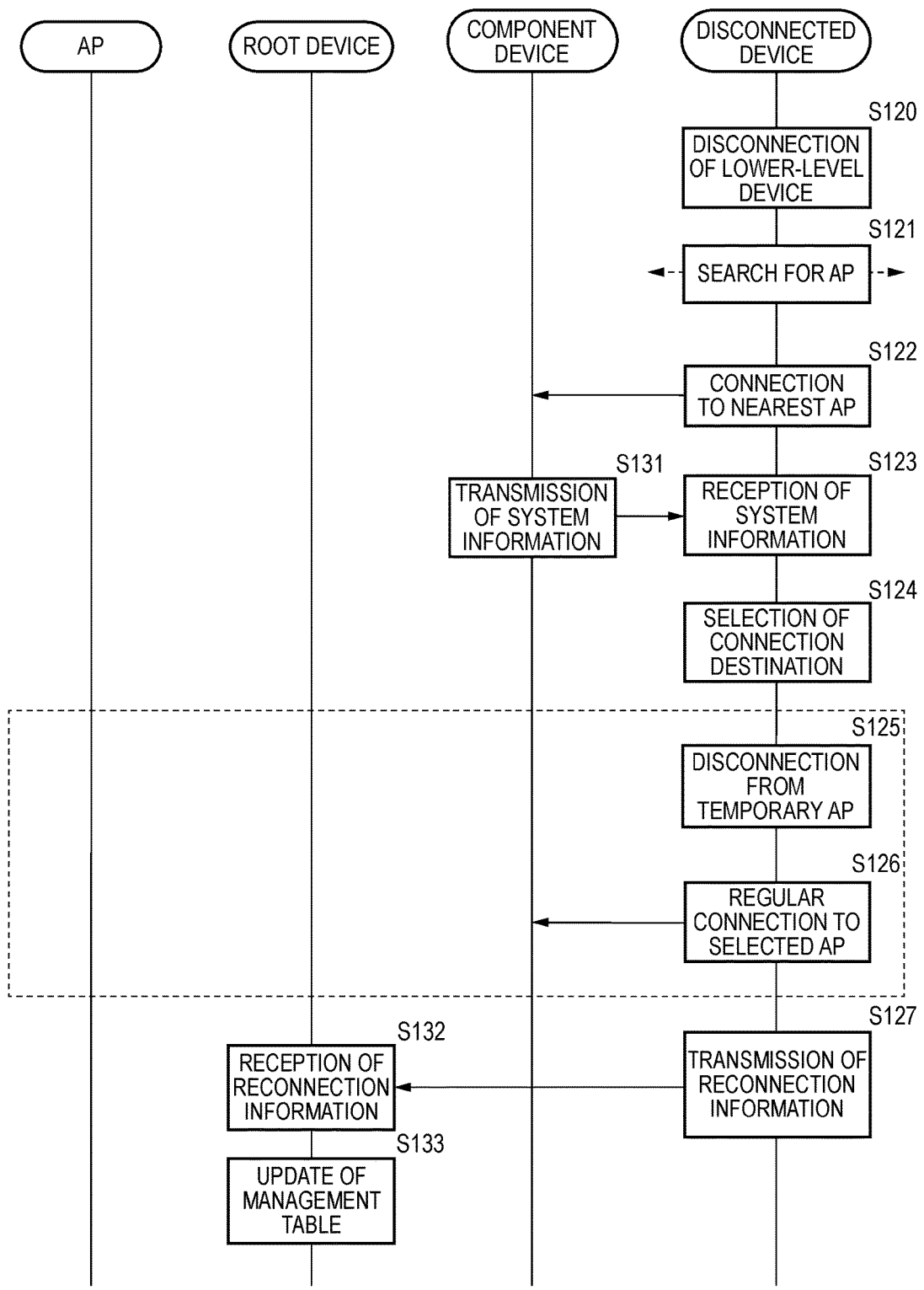
FIG. 11 is a view showing a procedure for communication at the reconnection time of an audio device.

The procedure for communication at the reconnection time will be described below referring to FIG. 11. The component device (hereafter referred to as the disconnected device) disconnected from the higher-level internal access point 4A stops its own internal access point 4A (at S120). If the internal access point 4A has been connected to a lower-level component device, the communication therebetween is disconnected, and the lower-level component device also starts this action.

The disconnected device searches for a connectable access point (at S121). On the basis of the system information stored in the disconnected device at the time, this search is carried out by active scanning the internal access points 4A described in the system information. Since the connection is attempted on the basis of the system information, the connection to an access point 4A is made possible without releasing the stealth mode. The disconnected device makes temporary connection to the nearest internal access point 4A that has been found by this search (at S123). This connection is temporary connection for obtaining the updated system information and is not the regular connection for returning to the audio system 10. The disconnected device then obtains the updated system information of the audio system 10 from the internal access point 4A (component device) used for the connection (at S131, S123). On the basis of the obtained system information, the disconnected device selects the optimal access point for the reconnection to the audio system 10 (at S124).

In the case that an access point other than the internal access point 4A used for the temporary connection at present is selected at S124, the disconnected device disconnects the connection to the internal access point 4A used for the temporary connection (at S125), and the disconnected device makes regular connection to the selected access point (at S126). The access point for the regular connection is not limited to the internal access point 4A. Even in the external access point 3, the connection information thereof is included in the system information in many cases. In the case that the internal access point 4A used for the temporary connection at present is judged optimal as the destination of the reconnection, the processes at S125 and S126 are not carried out.

At S127, the disconnected device transmits reconnection information including the information of the access point at the destination of the reconnection to the root device 4-1. The root device 4-1 receives this reconnection information (at S132), and this component device is rewritten as active and the system management table is updated (at S133). The updated contents are distributed to the respective component devices when the next system information packet is transmitted (refer to FIGS. 10A and 10B).

A procedure for changing the destination of the connection after the communication of a component device is disconnected and until reconnection is carried out will be described referring to FIGS. 12 to 15. In this example, the number of the component devices of the audio system 10 is less than that in the example shown in FIG. 1 by one, and one leaf device 4-7 is connected to the node device 4-3.

Figure 12:
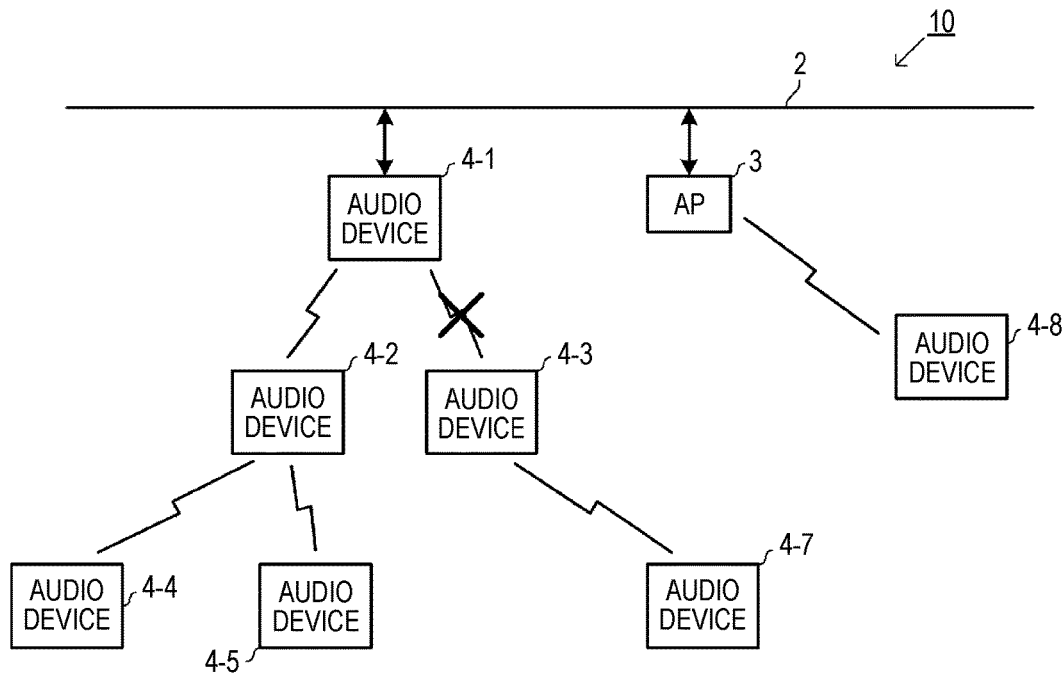
FIG. 12 is a view illustrating a mode in which the destination of the connection at the reconnection time in an audio system is changed.

FIG. 12 shows a situation in which the communication between the internal access point 4A-1 of the root device 4-1 and the node device 4-3 is disconnected, for example, due to the deterioration of radio wave condition. The communication between the internal access point 4A-1 of the root device 4-1 and the node device 4-2 is maintained.

Figure 13:
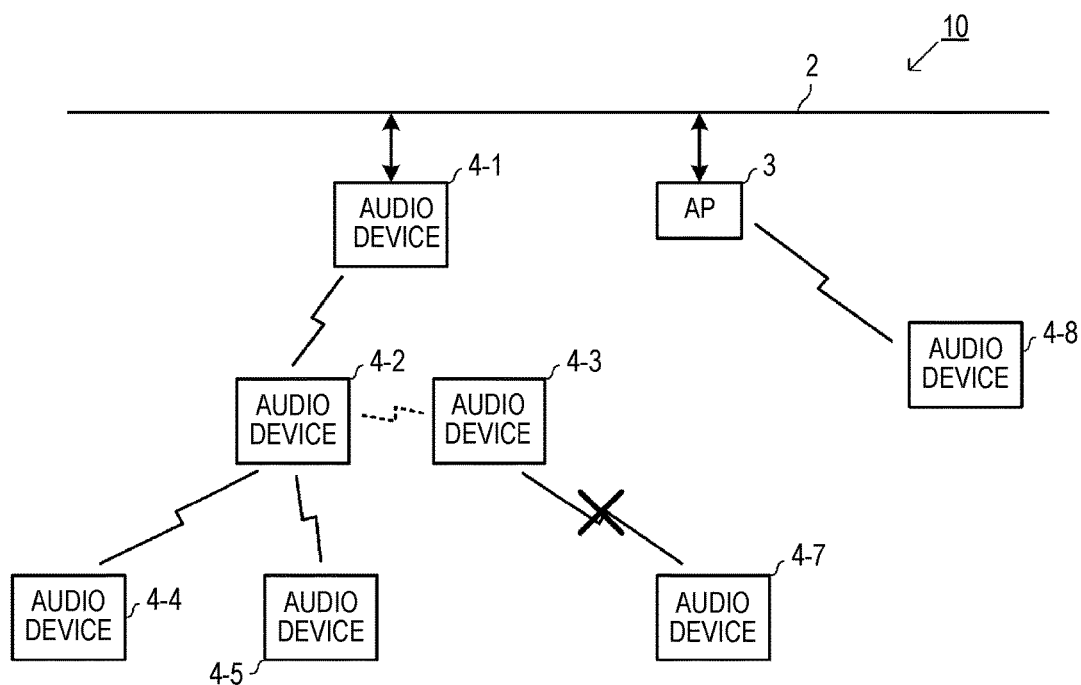
FIG. 13 is a view illustrating a mode in which the destination of the connection at the reconnection time in the audio system is changed.
Figure 14:
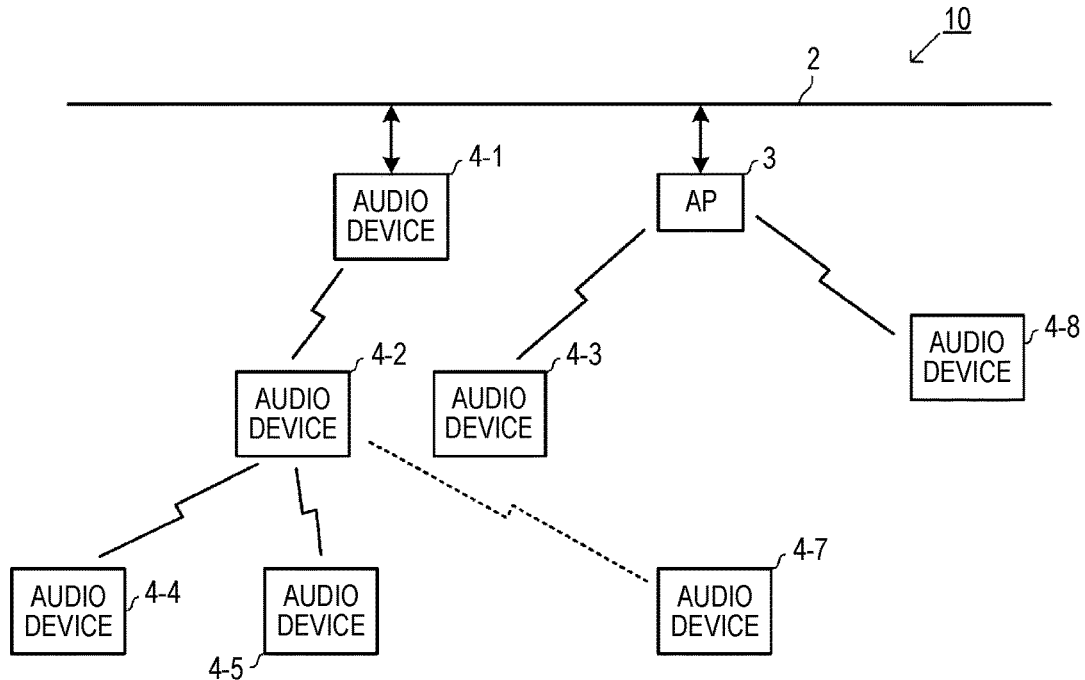
FIG. 14 is a view illustrating a mode in which the destination of the connection at the reconnection time in the audio system is changed.

In FIG. 13, the audio device 4-3 having stopped serving as a node device disconnects the communication with the lower-level leaf device 4-7 and makes reconnection to the nearest node device 4-2 on the basis of the system information that is stored at the time by the audio device itself. Although the audio device 4-3 obtains the updated system information from the node device 4-2, since the two leaf devices 4-4 and 4-5 have already been connected to the node device 4-2, the audio device 4-3 cannot make regular connection to the node device 4-2. Hence, on the basis of the system information, the audio device 4-3 selects the external access point 3 as another access point to which the connection is possible, and the audio device 4-3 makes connection to the external access point 3 and serves as a branch device as shown in FIG. 14. In the case that the communication with the internal access point 4A of the root device 4-1 is recovered, the audio device 4-3 may make reconnection to the root device 4-1.

Figure 15:
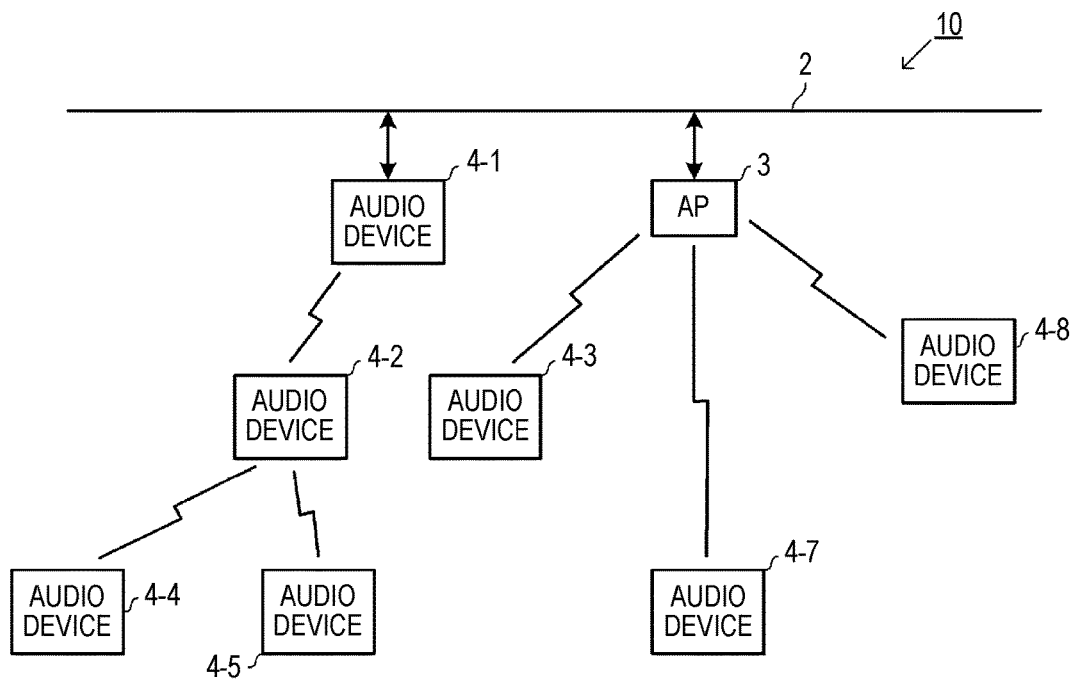
FIG. 15 is a view illustrating a mode in which the destination of the connection at the reconnection time in the audio system is changed.

Furthermore, in FIG. 14, the audio device 4-7 used as a leaf device makes reconnection to the nearest node device 4-2 on the basis of the system information stored at the time. Although the audio device 4-7 obtains the updated system information from the node device 4-2, since the two leaf devices 4-4 and 4-5 have already been connected to the node device 4-2, the audio device 4-7 cannot make regular connection to the node device 4-2. Hence, on the basis of the updated system information, the audio device 4-7 selects the external access point 3 as another access point to which the connection is possible, and the audio device 4-7 makes connection to the external access point 3 and serves as a branch device as shown in FIG. 15.

With this embodiment, since the number of the hierarchy levels of the tree is limited to three and the number of the lower-level devices capable of being connected to each audio device 4 is limited to two, the forms of the reconnection shown in FIGS. 12 to 15 are obtained; however, if the number of the hierarchy levels and the number of the lower-level devices are larger, the audio devices can be reconnected in trees having different forms.

The audio device in this disclosure may be an audio/visual (AV) device having a video reproducing function and includes a system in which these functions are mixed. Furthermore, in this embodiment, the control terminal device is achieved by the mobile phone 1 in which the audio system control program 70 (application program) has been installed; however, the control terminal device may have other configurations. For example, the control terminal device may be a tablet in which the audio system control program 70 is installed or may be a dedicated terminal device.

The embodiment according to this disclosure will be summarized as described below.

(1) The communication system according to this disclosure is a communication system including: a plurality of communication devices connected so as to be able to mutually communicate and to constitute a network; each of the plurality of communication devices being equipped with a first wireless communication section functioning as a wireless relay device of the network and a second wireless communication section functioning as a slave unit to be connected to another communication device in the network, wherein the second wireless communication section of a lower-level communication device accesses the first wireless communication section of a higher-level communication device, whereby the higher-level communication device and the lower-level communication device are connected so as to constitute the network; each of the plurality of communication devices stores system information including connection information for connection to the first wireless communication section of each communication device constituting the network; and when any one of the plurality of communication devices is disconnected from the higher-level communication device being connected thereto, the disconnected communication device searches for another communication device constituting the network using the system information and makes reconnection to the communication device detected by the search.

(2) In the communication system set forth in the above-mentioned item (1), for example, the system information is updated periodically in the network; and the disconnected communication device makes temporary connection to one of the communication devices based on the system information having been stored at the time of the disconnection, obtains the updated system information from the communication device used for the temporary connection, determines a communication device for regular connection based on the obtained system information, and makes regular connection to the determined communication device.

(3) In the communication system set forth in the above-mentioned item (1) or (2), for example, the first wireless communication section operates as an access point in a stealth mode, and the disconnected communication device searches for the other communication device by active scanning using the connection information obtained from the system information.

(4) In the communication system set forth in any one of the above-mentioned items (1) to (3), for example, each of the plurality of communication devices transmits the system information to the other communication device of the plurality of communication devices by multicast.

(5) In the communication system set forth in any one of the above-mentioned items (1) to (4), for example, the communication devices are audio devices.

(6) In the communication system set forth in any one of the above-mentioned items (1) to (5), for example, the wireless relay device is a wireless router or a wireless access point.

(7) In the communication system set forth in any one of the above-mentioned items (1) to (6), for example, a communication device having a smaller number of connection stages from a root device in a connection form of the plurality of communication devices constituting the network is a higher-level communication device, and a communication device having a larger number of connection stages from the root device than the higher-level communication device is a lower-level communication device.

(8) In the communication system set forth in any one of the above-mentioned items (1) to (7), for example, the system information includes at least one of the following: identification information of the communication system, identification information of the communication devices, identification information of the communication device at a connection destination, an IP address of the communication device at the connection destination, number of connection stages from a root device in the connection form of the plurality of communication devices constituting the network, a presence/absence of the activation of a first wireless communication section as a wireless relay device, number of the connected lower-level communication devices, and the operation state of communication.

(9) The communication device according to this disclosure is a communication device being equipped with a first wireless communication section functioning as a wireless relay device of a network, a second wireless communication section functioning as a slave unit to be connected to another communication device in the network, a storage section for storing system information including connection information for connection to the first wireless communication section of the other communication device constituting the network, and a control section, wherein, when the second wireless communication section is disconnected from the first wireless communication section of a higher-level communication device being connected thereto, the control section searches for another communication device constituting the network using the system information and makes reconnection to the other communication device detected by the search.

(10) In the communication device set forth in the above-mentioned item (9), for example, the system information is updated periodically by the higher-level communication device, and the control section makes temporary connection to one of the communication devices based on the system information having been stored at the time of the disconnection, obtains the updated system information from the communication device used for the temporary connection, determines a communication device for regular connection based on the obtained system information, and makes regular connection to the determined communication device.

(11) In the communication device set forth in the above-mentioned item (9) or (10), for example, the control section searches for the other communication device by active scanning using the connection information obtained from the system information.

(12) In the communication device set forth in any one of the above-mentioned items (9) to (11), for example, the control section transmits the system information to the other communication devices by multicast.

(13) In the communication device set forth in any one of the above-mentioned items (9) to (12), for example, the communication device further include an audio signal processing section configured to process an audio signal.

(14) In the communication device set forth in any one of the above-mentioned items (9) to (13), for example, the wireless relay device is a wireless router or a wireless access point.

(15) In the communication device set forth in any one of the above-mentioned items (9) to (14), for example, a communication device having a smaller number of connection stages from a root device in a connection form of the plurality of communication devices constituting the network is a higher-level communication device, and a communication device having a larger number of connection stages from the root device than the higher-level communication device is a lower-level communication device.

(16) In the communication device set forth in any one of the above-mentioned items (9) to (15), for example, the system information includes at least one of the following: identification information of the communication system, identification information of the communication devices, identification information of the communication device at a connection destination, an IP address of the communication device at the connection destination, number of connection stages from a root device in the connection form of the plurality of communication devices constituting the network, a presence/absence of the activation of the first wireless communication section as a wireless relay device, number of the connected lower-level communication devices, and an operation state of communication.

(17) The method for reconnecting a communication system according to this disclosure is a method for reconnecting a communication system, a plurality of communication devices being connected so as to constitute a network; each of the plurality of communication devices being equipped with a first wireless communication section functioning as a wireless relay device of the network and a second wireless communication section functioning as a slave unit to be connected to another communication device in the network; the second wireless communication section of a lower-level communication device accesses the first wireless communication section of a higher-level communication device, whereby the higher-level communication device and the lower-level communication device are connected so as to constitute the network; and each of the plurality of communication devices stores system information including connection information for connection to the first wireless communication section of each communication device constituting the network, wherein, when any one of the plurality of communication devices is disconnected from the higher-level communication device being connected thereto, the disconnected communication device searches for another communication device constituting the network using the system information and makes reconnection to the communication device detected by the search.

(18) In the method for reconnecting the communication system set forth in the above-mentioned item (17), for example, the system information is updated periodically in the network; and the disconnected communication device makes temporary connection to one of the communication devices based on the system information having been stored at the time of the disconnection, obtains the updated system information from the communication device used for the temporary connection, determines a communication device for regular connection based on the obtained system information, and makes regular connection to the determined communication device.

(19) In the method for reconnecting the communication system set forth in the above-mentioned item (17) or (18), for example, the first wireless communication section operates as a wireless relay device in a stealth mode, and the disconnected communication device searches for the other communication device by active scanning using the connection information obtained from the system information.

(20) In the method for reconnecting the communication system set forth in any one of the above-mentioned items (17) to (19), for example, the system information is transmitted in the network by multicast.

(21) In the method for reconnecting the communication system set forth in any one of the above-mentioned items (17) to (20), for example, the communication devices are audio devices.

(22) In the method for reconnecting the communication system set forth in any one of the above-mentioned items (17) to (21), for example, the wireless relay device is a wireless router or a wireless access point.

(23) In the method for reconnecting the communication system set forth in any one of the above-mentioned items (17) to (22), for example, a communication device having a smaller number of connection stages from a root device in the connection form of the plurality of communication devices constituting the network is a higher-level communication device, and a communication device having a larger number of connection stages from the root device than the higher-level communication device is a lower-level communication device.

(24) In the method for reconnecting the communication system set forth in any one of the above-mentioned items (17) to (23), for example, the system information includes at least one of the following: the identification information of the communication system, the identification information of the communication devices, the identification information of the communication device at a connection destination, the IP address of the communication device at the connection destination, the number of connection stages from a root device in the connection form of the plurality of communication devices constituting the network, the presence/absence of the activation of the first wireless communication section as a wireless relay device, the number of the connected lower-level communication devices, and the operation state of communication.

This disclosure is useful in that, even if a communication device is disconnected from a network, the device can easily make reconnection to the network.

What is claimed is:

1. A communication system comprising:
    a plurality of communication devices configured to be connected so as to be able to mutually communicate and to constitute a network;
    each of the plurality of communication devices comprising:
    a first wireless communication circuit configured to function as a wireless relay device of the network: and
    a second wireless communication circuit configured to function as a slave unit to be connected to another communication device in the network, wherein:
    the second wireless communication circuit of a lower-level communication device is configured to access the first wireless communication circuit of a higher-level communication device, whereby the higher-level communication device and the lower-level communication device are connected so as to constitute the network,
    each of the plurality of communication devices stores system information including connection information for connection to the first wireless communication circuit of each of the plurality of communication devices constituting the network,
    when any one of the plurality of communication devices is disconnected from the higher-level communication device connected thereto, the disconnected communication device is configured to search for another communication device constituting the network using the system information and to make reconnection to a communication device detected by the search, the system information is updated periodically in the network, and the disconnected communication device, in the search and reconnection, is configured to:

make temporary connection to one of the plurality of communication devices based on the system information having been stored at the time of the disconnection, obtain the updated system information from the communication device used for the temporary connection, determine a communication device for regular connection based on the obtained system information, and make regular connection to the determined communication device.

2. The communication system according to claim 1, wherein:

the first wireless communication circuit is configured to operate as a wireless relay device in a stealth mode, and the disconnected communication device is configured to search for the other communication device by active scanning using the connection information obtained from the system information.

3. The communication system according to claim 1, wherein:

each of the plurality of communication devices is configured to transmit the system information to the other communication device of the plurality of communication devices by multicast.

4. The communication system according to claim 1, wherein:

the communication devices are audio devices.

5. The communication system according to claim 1, wherein:

the wireless relay device is a wireless router or a wireless access point.

6. The communication system according to claim 1, wherein:

a communication device having a smaller number of connection stages from a root device in a connection form of the plurality of communication devices constituting the network is a higher-level communication device, and a communication device having a larger number of connection stages from the root device than the higher-level communication device is a lower-level communication device.

7. The communication system according to claim 1, wherein:

the system information includes at least one of the following: the identification information of the communication system, identification information of the communication devices, identification information of the communication device at a connection destination, an IP address of the communication device at the connection destination, a number of connection stages from a root device in the connection form of the plurality of communication devices constituting the network, a presence/absence of an activation of a first wireless communication section as a wireless relay device, a number of the connected lower-level communication devices, and an operation state of communication.

8. A communication device comprising:

a first wireless communication circuit configured to function as a wireless relay device of a network;

a second wireless communication circuit configured to function as a slave unit to be connected to another communication device in the network;

a processor;

a storage configured to store system information including connection information for connection to the first wireless communication circuit of the other communication device constituting the network; and a memory having stored thereon instructions executable by the processor to cause the communication device to:

when the second wireless communication circuit is disconnected from the first wireless communication circuit of a higher-level communication device connected thereto, search for another communication device constituting the network using the system information and make reconnection to another communication device detected by the search, wherein:

the system information is updated periodically by the higher-level communication device, and the instructions cause the communication device, in the search and reconnection, to:

make temporary connection to one of a plurality of communication devices based on the system information having been stored at the time of the disconnection, obtain the updated system information from the communication device used for the temporary connection, determine a communication device for regular connection based on the obtained system information, and make regular connection to the determined communication device.

9. The communication device according to claim 8, wherein:

the instructions cause the communication device to search for the other communication device by active scanning using the connection information obtained from the system information.

10. The communication device according to claim 8, wherein:

the instructions cause the communication device to transmit the system information to the other communication devices by multicast.

11. The communication device according to claim 8, further comprising:

an audio signal processor configured to process an audio signal.

12. The communication device according to claim 8, wherein:

the wireless relay device is a wireless router or a wireless access point.

13. The communication device according to claim 8, wherein:

a communication device having a smaller number of connection stages from a root device in a connection form of the plurality of communication devices constituting the network is a higher-level communication device, and a communication device having a larger number of connection stages from the root device than the higher-level communication device is a lower-level communication device.

14. The communication device according to claim 8, wherein:

the system information includes at least one of the following: the identification information of the communication system, identification information of the communication devices, identification information of the communication device at a connection destination, an IP address of the communication device at the connection destination, a number of connection stages from a root device in the connection form of the plurality of communication devices constituting the network, a presence/absence of the activation of the first wireless communication circuit as a wireless relay device, a number of the connected lower-level communication devices, and an operation state of communication.

15. A method for reconnecting a communication system including a plurality of communication devices configured to be connected so as to constitute a network, each of the plurality of communication devices comprising a first wireless communication circuit configured to function as a wireless relay device of the network and a second wireless communication circuit configured to function as a slave unit to be connected to another communication device in the network, the second wireless communication circuit of a lower-level communication device being configured to access the first wireless communication circuit of a higher-level communication device, whereby the higher-level communication device and the lower-level communication device are connected so as to constitute the network, the method comprising:

storing, by each of the plurality of communication devices, system information including connection information for connection to the first wireless communication circuit of each communication device constituting the network;

searching, when any one of the plurality of communication devices is disconnected from the higher-level communication device being connected thereto, the disconnected communication device for another communication device constituting the network using the system information; and making reconnection, by the disconnection communication device, to a communication device detected by the search, wherein:

the system information is updated periodically in the network, and the searching and making reconnection by the disconnected communication device includes:

making temporary connection to one of the communication devices on the basis of the system information having been stored at the time of the disconnection, obtaining the updated system information from the communication device used for the temporary connection, determining a communication device for regular connection on the basis of the obtained system information, and making regular connection to the determined communication device.

16. The method for reconnecting the communication system according to claim 15, wherein:

the first wireless communication circuit operates as a wireless relay device in a stealth mode, and the disconnected communication device searches for the other communication device by active scanning using the connection information obtained from the system information.

17. The method for reconnecting the communication system according to claim 15, wherein the system information is transmitted in the network by multicast.

* * * * *